US012647959B2

(12) United States Patent
Chen et al.

(10) Patent No.: US 12,647,959 B2
(45) Date of Patent: Jun. 2, 2026

(54) USER EQUIPMENT CAPABILITY SIGNALING FOR MEASUREMENT GAP ENHANCEMENTS

(71) Applicant: Apple Inc., Cupertino, CA (US)

(72) Inventors: Yuqin Chen, Beijing (CN); Dawei Zhang, Saratoga, CA (US); Fangli Xu, Beijing (CN); Haijing Hu, Los Gatos, CA (US); Qiming Li, Beijing (CN)

(73) Assignee: APPLE INC., Cupertino, CA (US)

( * ) Notice: Subject to any disclaimer, the term of this patent is extended or adjusted under 35 U.S.C. 154(b) by 1213 days.

(21) Appl. No.: 17/438,616

(22) PCT Filed: Aug. 4, 2021

(86) PCT No.: PCT/CN2021/110615
§ 371 (c)(1),
(2) Date: Feb. 9, 2023

(87) PCT Pub. No.: WO2023/010346
PCT Pub. Date: Feb. 9, 2023

(65) Prior Publication Data
US 2024/0032008 A1      Jan. 25, 2024

(51) Int. Cl.
*H04W 72/00* (2023.01)
*H04W 72/0457* (2023.01)
*H04W 72/51* (2023.01)

(52) U.S. Cl.
CPC ....... *H04W 72/0457* (2023.01); *H04W 72/51* (2023.01)

(58) Field of Classification Search
None
See application file for complete search history.

(56) References Cited

U.S. PATENT DOCUMENTS

| | | | |
|---|---|---|---|
| 2019/0182000 A1 | 6/2019 | Futaki | |
| 2021/0045003 A1 | 2/2021 | Li et al. | |
| 2022/0368437 A1 * | 11/2022 | Abedini | H04B 7/2606 |
| 2022/0376863 A1 * | 11/2022 | Da Silva | H04B 7/0626 |

FOREIGN PATENT DOCUMENTS

| | | | | |
|---|---|---|---|---|
| CN | 110035426 | 7/2019 | | |
| CN | 111435891 | 7/2020 | | |
| CN | 113079526 A | 7/2021 | | |
| WO | 2019029510 A1 | 2/2019 | | |
| WO | 2020060952 | 3/2020 | | |
| WO | WO-2021243530 A1 * | 12/2021 | | H04W 24/10 |
| WO | WO-2022205385 A1 * | 10/2022 | | H04W 36/0088 |

(Continued)

OTHER PUBLICATIONS

On Pre-Configured Mg Pattern(S) for NR_MG_ENH, OPPO, 3GPP TSG-RAN WG4 Meeting # 98-bis-e, R4-2106535, Apr. 12-20, 2021, 6 pages.

(Continued)

*Primary Examiner* — Gerald A Smarth
(74) *Attorney, Agent, or Firm* — Kilpatrick Townsend & Stockton LLP

(57) ABSTRACT

The present application relates to devices and components including apparatus, systems, and methods for measurement configurations and user equipment capability reporting in wireless networks.

20 Claims, 12 Drawing Sheets

800

(56)                    References Cited

FOREIGN PATENT DOCUMENTS

WO        WO-2023010261 A1  *  2/2023  ........... H04W 24/00

OTHER PUBLICATIONS

International Patent Application No. PCT/CN2021/110615, International Search Report and Written Opinion, Mailed on Apr. 27, 2022, 9 pages.
WF on R17 NR MG enhancements—Pre-configured MG, Intel, 3GPP TSG-RAN WG4 Meeting #99e, R4-2108034, May 19-27, 2021, 10 pages.
WF on R17 NR MG enhancements—Multiple concurrent and independent MG patterns, Mediatek, Inc., 3GPP TSG-RAN WG4 Meeting #99e, R4-2108346, May 19-27, 2021, 11 pages.

WF on R17 NR MG enhancements—NCSG, Intel, 3GPP TSG-RAN WG4 Meeting #99e, R4-2108348, May 19-27, 2021, 11 pages.
3rd Generation Partnership Project; Technical Specification Group Radio Access Network; NR; User Equipment (UE) radio access capabilities (Release 16), 3GPP TS 38.306 V16.5.0, Jun. 2021, 153 pages.
3rd Generation Partnership Project; Technical Specification Group Radio Access Network; NR; Radio Resource Control (RRC) protocol specification (Release 16), 3GPP TS 38.331 V16.5.0, Jun. 2021, 959 pages.
Report of [107#81][NR TEI16] Need-for-Gaps Signalling, 3rd Generation Partnership Project Technical Specification Group-Radio Access Network Working Group2, Meeting #107bis, R2-1913847, Oct. 14-18, 2019, 10 pages.
China Patent Aplication No. 202180008098.3, Office Action, Jun. 20, 2025, 20 pages.
International Patent Application No. PCT/CN2021/110615, International Preliminary Report on Patentability, Feb. 15, 2024, 5 pages.

* cited by examiner

Base station 112

UE 104

Base station 108

100

400

500

| UE 104 | | Base station 108 |

504 — UE Capability Enquiry

508 — UE Capability Information

512 — RRC Reconfig/Resume w/ CA and BWP config
(indicating BWP-specific/generic needforgap Req)

516 — RRC Reconfig/Resume Complete
(For each BWP on CC1/CC2, and for each meas freq: gap needed,
gap type (legacy/NCSG), gap pattern 520 — RRC Reconfig w/ meas config
(including gap config)

700

704 RRC Reconfig/Resume w/ CA, BWP config, and meas config
(indicating BWP-specific/generic needforgap Req)

708 RRC Reconfig/Resume Complete
(For each BWP on CC1/CC2, and for each MO: gap needed, gap type
(legacy/NCSG), gap pattern 712 RRC Reconfig w/ updated meas config
(including gap config)

800

Receiving configuration information to configure BWPs
804

Determining whether MGs are needed for BWPs
808

Generating UE capability message with indications of whether MGs are
needed for individual BWPs
812

900

1000

Transmitting configuration information to UE to configure BWPs
1004

Receiving a UE capability message with indications of whether MGs are needed for individual BWPs
1008

Transmitting gap configuration information to UE based on the UE capability message
1012

USER EQUIPMENT CAPABILITY SIGNALING FOR MEASUREMENT GAP ENHANCEMENTS

CROSS-REFERENCES TO RELATED APPLICATIONS

This application is a U.S. National Stage Application of PCT/CN2021/110615, filed Aug. 4, 2021. The disclosure of which is herein incorporated by reference in its entirety for all purposes.

BACKGROUND

Third Generation Partnership Project (3GPP) Technical Specifications (TSs) define standards for wireless networks. These TSs describe aspects related to measurements and related configurations within the wireless networks.

DETAILED DESCRIPTION

Figure 1:
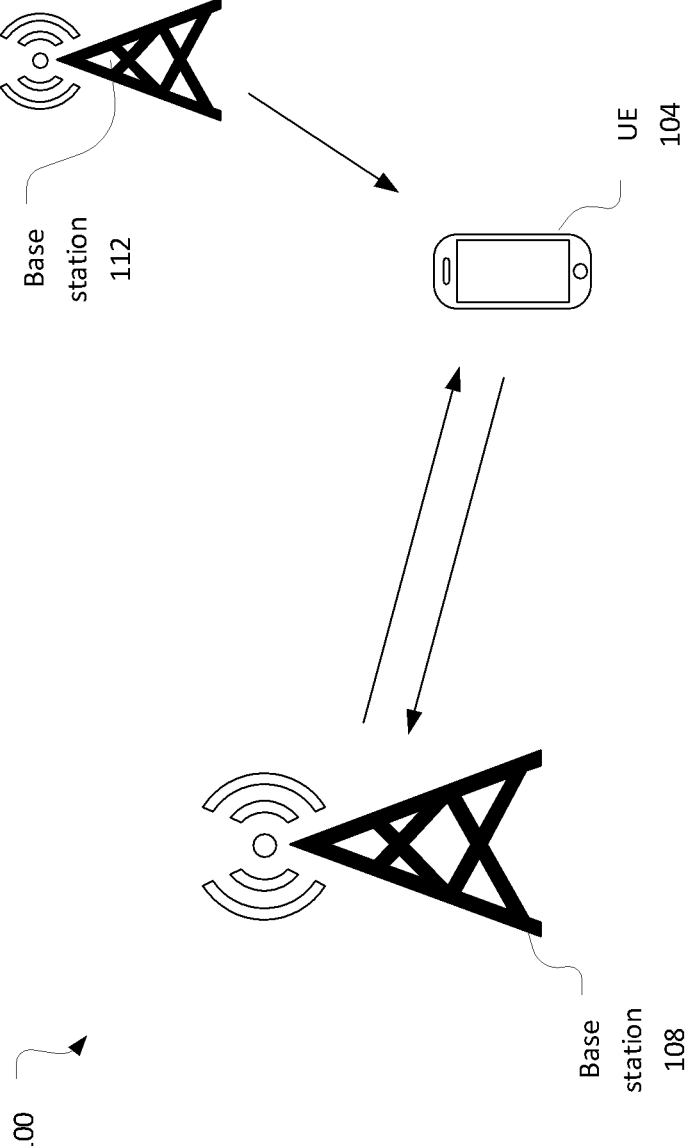
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, and techniques in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components that are configured to provide the described functionality. The hardware components may include an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), or a digital signal processor (DSP). In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, and network interface cards.

The term "user equipment" or "UE" as used herein refers to a device with radio communication capabilities that may allow a user to access network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, or workload units. A "hardware resource" may refer to compute, storage, or network resources provided by physical hardware elements. A "virtualized resource" may refer to compute, storage, or network resources provided by virtualization infrastructure to an application, device, or system. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, or a virtualized network function.

The term "information element" refers to a structural element containing one or more fields. The term "field" refers to individual contents of an information element, or a data element that contains content. An information element may include one or more additional information elements.

FIG. 1 illustrates a network environment 100 in accordance with some embodiments. The network environment 100 may include a UE 104 communicatively coupled with a base station such as, for example, base station 108. The UE 104 and the base station 108 may communicate over air interfaces compatible with 3GPP TSs such as those that define Fifth Generation (5G) new radio (NR) system standards. The base station 108 may be a next generation node B (gNB) to provide one or more 5G New Radio (NR) cells to provide NR user plane and control plane protocol terminations toward the UE 104.

The base station 108 may provide one or more cells using a carrier aggregation (CA) or dual-connectivity (DC) deployment. In a CA deployment, the cells may include a primary serving cell (PCell) to provide some or all of the control signaling through signaling radio bearers (SRBs) and one or more secondary serving cells (SCells) to provide one or more data radio bearers (DRBs) to increase throughput capability of the system. A PCell may be configured on a primary component carrier (PCC) and the SCells may be configured on secondary component carriers (SCCs).

In a DC deployment, a plurality of base stations may simultaneously provide radio access. One of the base stations may be configured as a master node (MN) to provide a control plane connection to a core network. The MN may be associated with a group of CA serving cells referred to as a master cell group (MCG). The other base station may be configured as a secondary node (SN), which may not have a control plane connection to the core network 116. The SN may be used to provide additional resources to the UE 104. The SN may be associated with a group of CA serving cells referred to as a secondary cell group (SCG). The configuration may be an NE-DC configuration if the MN is a gNB and the SN is an eNB that provides a Long Term Evolution (LTE) cell; an EN-DC configuration if the MN is an eNB and the SN is a gNB; and an NR-DC if both the MN and the SN or gNBs.

The network environment 100 may further include a base station 116 that provides a neighbor cell. The base station 112 may use the same radio access technology as the base station 108 or a different radio access technology. For example, the base station 112 may provide one or more NR cells or may provide one or more LTE cells.

To adapt to changes in a radio environment and relative positioning between the UE 104 and the base stations, the UE 104 may be configured to perform a variety of measurements on reference signals transmitted by base station 108 and one or more neighbor base stations, for example, base station 112. The base station 108 may transmit a measurement configuration to provide the UE 104 with information to perform the reference signal measurements.

The measurement configuration may instruct the UE 104 to perform intra-frequency, inter-frequency, or inter-system measurements based on reference signals that include, for example, synchronization signal and physical broadcast channel blocks (SSB) and channel state information-reference signal (CSI-RS) resources. The measurements may be beam-level or cell-level. SSB intra-frequency measurements may correspond to situations in which both the serving cell and the neighbor cell use the same SSB center frequency and subcarrier spacing. The CSI-RS intra-frequency measurements may correspond to situations in which the neighbor cell is configured with a CSI-RS resource bandwidth that is confined within a bandwidth of the CSI-RS resource belonging to the serving cell, and both CSI-RSs use the same subcarrier spacing. Inter-system measurements may be performed in the event the serving cell is an NR cell and the neighbor cell is an LTE cell, or vice versa.

The measurement configuration may be transmitted to the UE 104 while the UE 104 is in a radio resource control (RRC)-connected mode by dedicated signaling such as RRC signaling, for example, an RRC reconfiguration message or RRC resume message.

In some embodiments, a measurement configuration may include (directly or by reference) a measurement identity, a measurement object, and a reporting configuration. The measurement identity may link a reporting configuration to a measurement object. The measurement identity may include a first pointer toward a reporting configuration and a second pointer toward a measurement object. The UE 104 may provide measurement results within an RRC message (for example, an RRC measurement report) that includes the measurement ID as a reference.

The measurement objects provides the time and frequency location of the SSB or CSI-RS resources to be measured. The measurement objects may also provide information on subcarrier spacing, measurement offsets, and beam level to cell level derivation parameters.

The reporting configuration may provide a periodic, event-triggered, or cell global identity (CGI) configuration. The reporting configuration may include parameters such as report amount, reporting interval, and, if the configuration is an event-triggered configuration, a measurement reporting event. The report amount and reporting interval may be abstract syntax notation one (ASN.1) fields in a report configuration information element (IE). The report amount may describe how many times a measurement report is to be transmitted based on a triggering event. The triggering event may be a period elapsing (for a periodic configuration) or a triggering condition of a measurement reporting event being satisfied (for an event-triggered configuration). The reporting interval may provide a time between successive transmissions of the measurement report. The reporting configuration may further describe the reference signal type (for example, SS-PBCH or CSI-RS) that may be used for the periodic or event-triggered configurations.

The base station 108 may configure the UE 104 with measurement gaps to perform configured measurements that cannot be completed while the UE 104 is tuned to the current serving cell. Measurement gaps for inter-frequency or inter-system measurements may provide the UE 104 time to retune its transceiver to a target carrier, complete the measurements, and retune its transceiver back to the original carrier. In some scenarios, the UE 104 may also re-direct its beam to perform the measurements. Measurement gaps for intra-frequency measurements may be provided if the UE 104 is configured with an active bandwidth part (BWP) but does not contain the intra-frequency target (for example, SSB). In this case, the measurement gap may provide the UE 104 with the time to retune its transceiver to the intra-frequency target, perform the measurement, and re-tune the transceiver back to the active BWP.

The measurement gap may be configured by a measurement gap configuration (MeasGapConfig) information element (IE) that specifies the measurement gap configuration and control setup/release of measurement gaps. The MeasGapConfig IE may include indications for a measurement gap configuration that applies to frequency range 1 (FR1) only (for example, an FR1 gap); to frequency range 2 (FR2) only (for example, an FR2 gap); or to a UE for all frequencies (for example, a UE gap). The MeasGapConfig IE may be similar to that described in section 6.3.2 of 3GPP TS 38.331 v16.5.0 (2021-06).

Measurement gap (MG) capability information may be provided on a per-UE basis in measurement and mobility parameters. This information may include an inter-frequency-measurement-no-gap field to indicate whether the UE can perform inter-frequency SSB based measurements without measurement gaps if the SSB is completely contained in the active BWP of the UE.

The MG capability information may further include a supported-gap-pattern field to indicate measurement gap patterns that are supported by UE for NR standalone (SA) operation, NR DC for positioning reference signal (PRS) measurements, and NR/E-UTRA radio resource management (RRM) measurement. The measurement gap patterns may be defined in 3GPP TS 38.133 v17.2.0 (2021-07-09).

The MG capability information may further include a supported-gap-pattern-NR-only field to indicate measurement gap patterns that are supported by the UE for NR SA and NR-DC when the frequencies to be measured within this measurement gap are all NR frequencies.

The MG capability information may further include a supported-gap-pattern-NR-only-NE-DC field to indicate whether the UE supports gap patterns 2, 3, and 11 in NE-DC when the frequencies to be measured within this measurement gap are all NR frequencies.

The MG capability information may further include a measurement-gap-patterns-NR-only-EN-DC field to indicate whether the UE supports gap patterns 2, 3, and 11 in (NG)EN-DC when the frequencies to be measured within this measurement gap are all NR frequencies.

In an existing signaling design, the network (e.g., the base station) may provide a UE with need-for-gaps configuration information in a NeedForGapsConfigNR IE in an RRC reconfiguration message. The NeedForGapsConfigNR IE may include configuration information related to reporting of measurement gap requirement information. This may include an indication of target bands for which the UE is requested to report gap requirement information.

The UE may then respond by reporting UE capability information in an RRC reconfiguration complete message based on the band combinations configured by the network. The UE capability information may be transmitted by a need-for-gaps information (NeedForGapsInfoNR) IE that indicates whether measurement gap is required for the UE to perform measurements on an NR target band. In the existing design, the UE will report that a gap is needed in a gap indication field of the NeedForGapsInfoNR IE if any configured BWP requires a gap on a measurement frequency (for example, intra-frequency serving cell or inter-frequency target bands).

The NeedForGapsConfigNR and NeedForGapsInfoNR IEs may be similar to those described in section 6.3.2 of 3GPP TS 38.331 except as otherwise described herein.

Various RRM features are being added to Release 17 networks. These include preconfigured MGs, multiple concurrent and independent MGs, and network controlled small gaps (NCSGs).

The preconfigured MG feature may allow the network to indicate to the UE whether a preconfigured MG is activated for each BWP. Then, if the UE works on a particular BWP, the UE does not need to apply MG to save the scheduling opportunity. The preconfigured MG may be applicable to all MOs. Thus, the UE may activate/deactivate the preconfigured MG based only on the BWP on which it is operating. The network may provide the activation/deactivation indication to the UE for each BWP, or the UE and network may perform a common criteria check that is determinative as to when the preconfigured MG is to be activated/deactivated. Thus, this design of the preconfigured MG provides that, for each configured BWP, the UE/NW needs to determine whether the pre-configured gap should be applied. The determination may be done by the network, which may send an explicit indication with an on/off flag, or by the UE without the on/off flag.

Multiple concurrent and independent MGs may be associated with one or more use cases. For example, one or more MOs may be configured for the same or different radio access technologies (RATs), SSB/CSI-RS in each associated NR MO, or PRS.

The NCSG feature is provided for situations in which the UE only needs to perform RF retuning upon measurement and the measurement length (ML) does not interrupt data transmission/reception.

Figure 2:
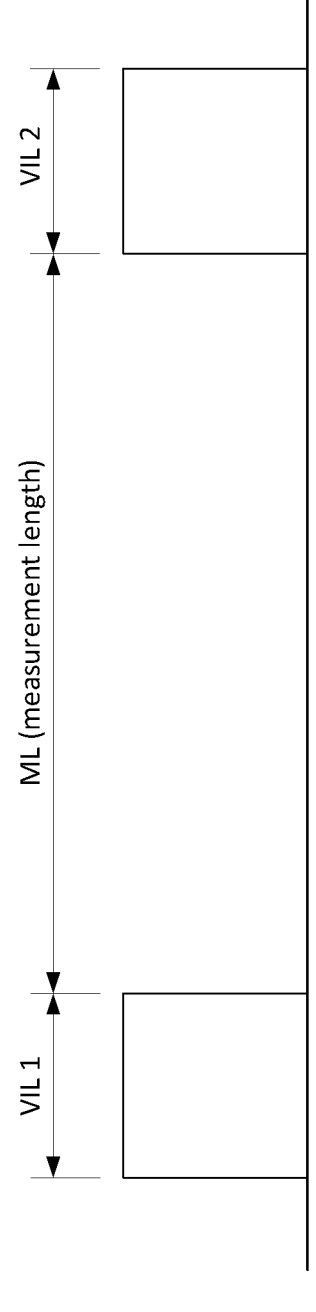
FIG. 2 illustrates a network-configured small gap pattern in accordance with some embodiments.

FIG. 2 illustrates an NCSG pattern 200 that may be used in some embodiments. The NCSG pattern 200 may include a visible interruption length (VIL) 1 at the beginning of the NCSG pattern 200 and a VIL2 at the end of the NCSG pattern 200. Between the VIL1 and the VIL2, the NCSG pattern 200 may include an ML in which the UE may be capable of both communicating with the network and performing measurements on a target. Thus, the actual gaps in communication may only be needed for the tuning/retuning that occurs at VIL1/VIL2. No gaps in communication are needed or provided during the ML.

With current designs, the network may not have sufficient information about whether a UE needs a gap for each configured BWP. This may lead to a suboptimal "on/off" configuration since the only decisive factor would be whether the BWP is overlapping with a target frequency to measure. However, in some instances, the UE may be capable of performing the measurement outside of a measurement gap even if a BWP is not overlapping with the target frequency. For example, the UE may have an additional RF chain or other RF capabilities that allow it to perform the measurement without interfering with communications.

Further, for preconfigured measurement gaps, either NCSG or legacy gap may be possible. For example, if the BWP is adjacent to the carrier to be measured according to the MO, only an NCSG may be needed since the UE can enlarge its bandwidth to cover the target reference signal. However, the network may have no knowledge of this and may configure the UE with a legacy gap.

Various embodiments provide for measurement configuration signaling to account for these and other situations.

In some embodiments, the basic NeedForGap framework for intra-frequency and inter-frequency reporting may be updated to accommodate further flexibility and efficiencies with respect to configured measurements. In some embodiments, the UE 104 may report its capability on NeedForGap for each configured BWP across serving cells (or partial cells) for each frequency to measure.

Figure 3:
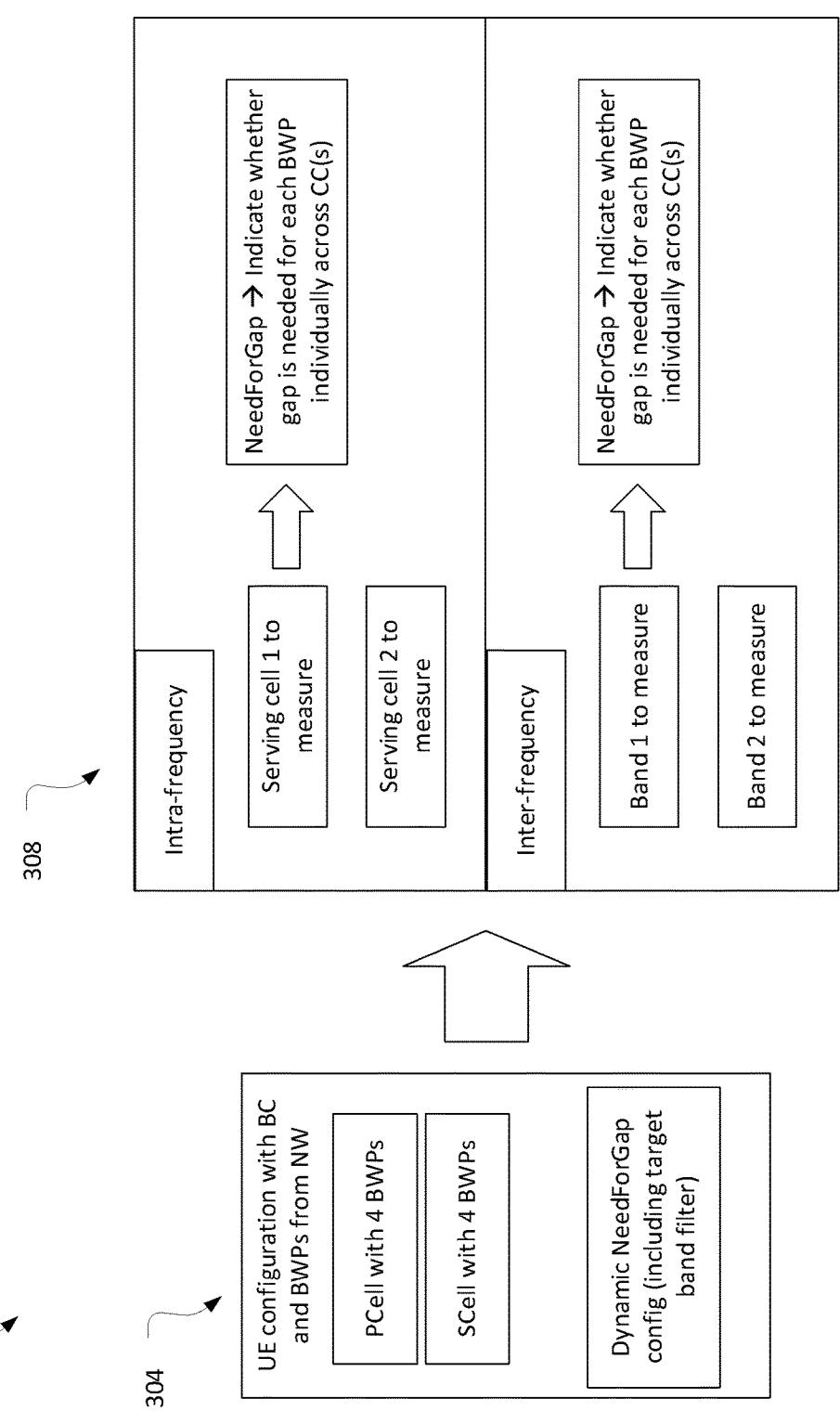
FIG. 3 illustrates configuration and user equipment (UE) capability information in accordance with some embodiments.

FIG. 3 illustrates configuration and UE capability information 300 in accordance with some embodiments.

The information 300 may include a UE configuration 304 provided by a serving cell of the network. The UE configuration 304 may provide the band combinations (BC) and BWPs on which the UE 104 is to operate. As shown, the UE 104 may be configured with a PCell having four BWPs and an SCell with four BWPs. While the UE configuration 304 generally illustrates a carrier aggregation scenario, other embodiments may equally apply to dual connectivity scenarios.

The UE configuration 304 may also include a dynamic NeedForGap configuration that provides the UE 104 with configuration information related to reporting measurement gap requirement information. The dynamic NeedForGap configuration may be provided in a NeedForGapsConfigNR IE that also includes a target band filter that provides an indication of target bands for which the UE 104 is requested to report gap requirement information.

The information 300 may further include UE capability information 308 for intra-frequency and inter-frequency configurations.

For the intra-frequency configurations, the UE 104 may be configured to measure serving cell 1 and serving cell 2.

These serving cells to measure may have been indicated by the target band filter of the dynamic NeedForGap configuration.

The UE 104 may determine that at least one measurement gap is needed for measuring serving cell 1 and no gaps are needed for measuring serving cell 2. Thus, the UE 104 may generate a NeedForGapinfo IE for the serving cell 1 that may be transmitted to the base station 108. The NeedForGapinfo IE may indicate whether a gap is needed for each BWP individually across the CCs. For example, with reference to the UE configuration 304, the UE 104 may indicate whether a gap is needed in each of the eight BWPs (four for the PCell and four for the SCell). This NeedForGap information may be referred to herein as BWP-specific NeedForGap information.

As no gaps are needed for the BWPs to measure serving cell 2, the UE 104 may not need to generate/transmit a NeedForGapinfo IE for serving cell 2. In some embodiments, if none of the BWPs need a gap, or if all the BWPs need a gap, the UE 104 may generate a legacy, BWP-generic NeedForGapinfo IE that indicates gap or no gap for all BWPs as appropriate.

For the inter-frequency configurations, the UE 104 may be configured to measure band 1 and band 2. These bands to measure, which may be outside of the serving cell frequency, may have been indicated by the target band filter of the dynamic NeedForGap configuration.

The UE 104 may determine that at least one measurement gap is needed for measuring band 1 and no gaps are needed for measuring band 2. Thus, the UE 104 may generate a NeedForGapinfo IE for band 1 that may be transmitted to the gNB 108. The NeedForGapinfo IE may indicate whether a gap is needed for each BWP individually across the CCs. For example, with reference to the UE configuration 304, the UE 104 may indicate whether a gap is needed in each of the eight BWPs (four for the PCell and four for the SCell).

As no gaps are needed for the BWPs to measure band 2, the UE 104 may not need to generate/transmit a NeedForGapinfo IE for band 2 or the UE 104 may generate/transmit a BWP-generic NeedForGapinfo IE with a "no gap" indication.

Figure 4:
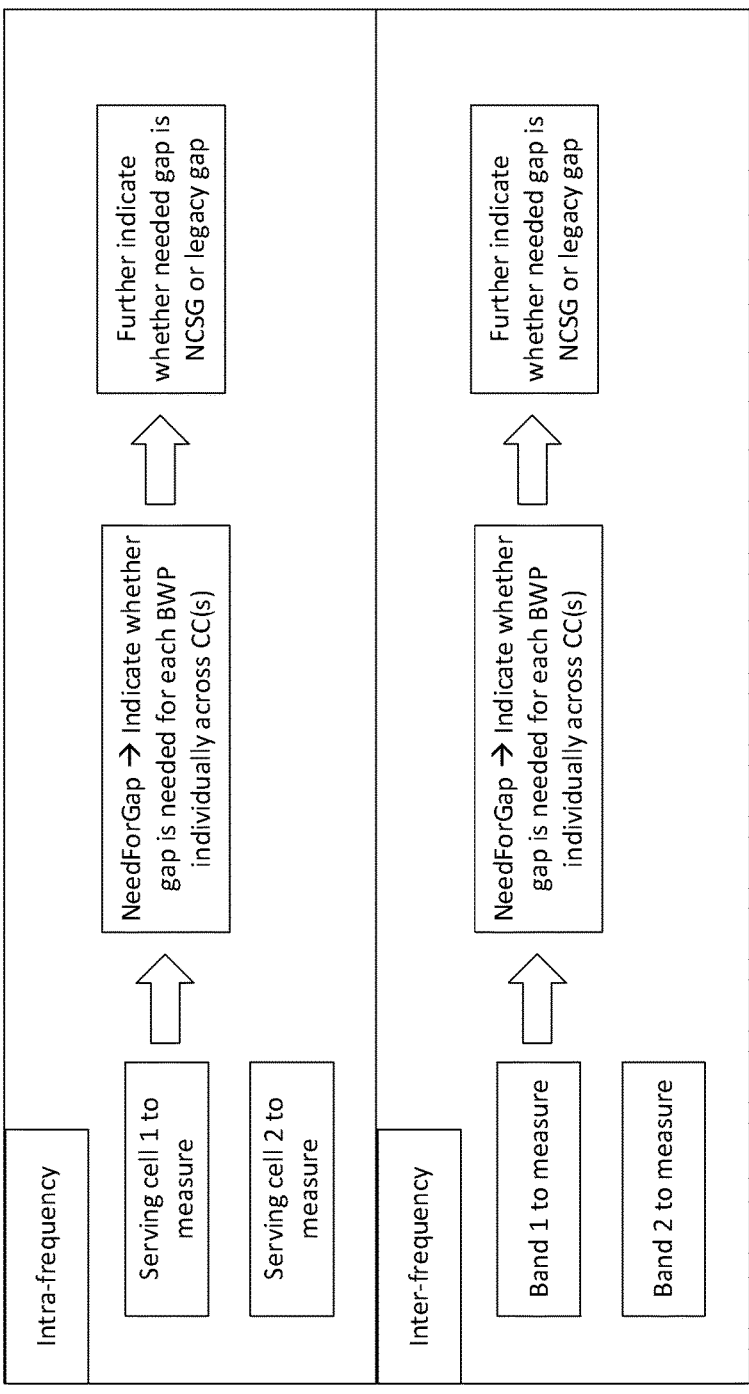
FIG. 4 illustrates user equipment (UE) capability information in accordance with some embodiments.

FIG. 4 illustrates UE capability information 400 in accordance with some embodiments. The UE capability information 400 may apply to intra-frequency and inter-frequency configurations.

For the intra-frequency configurations, the UE 104 may be configured to measure serving cell 1 and serving cell 2. These serving cells to measure may have been indicated by the target band filter of the dynamic NeedForGap configuration such as that provided in UE configuration 304.

The UE 104 may determine that at least one measurement gap is needed for measuring serving cell 1 and no gaps are needed for measuring serving cell 2. Thus, the UE 104 may generate a NeedForGapinfo IE for the serving cell 1 that may be transmitted to the base station 108. The NeedForGapinfo IE may indicate whether a gap is needed for each BWP individually across the CCs. For example, with reference to the UE configuration 304, the UE 104 may indicate whether a gap is needed in each of the eight BWPs (four for the PCell and four for the SCell).

In addition to the indication of the need for a gap, the NeedForGapinfo IE may also indicate whether the needed gap is an NCSG, a legacy gap, or both. This may provide the UE 104 with additional flexibility to dynamically request only the specific gaps that are needed for each BWP based on the specific capabilities of the UE 104.

In some embodiments, the NeedForGapinfo IE may also indicate a desired gap pattern. For example, the UE 104 may request configuration of one or more specific gap patterns such as those defined in TS 38.133. In some embodiments, the desired gap pattern may not be BWP-specific as it may be based on UE capability. Thus, the desired gap pattern may be reported at a higher granularity and apply to all BWPs in some embodiments.

As no gaps are needed for the BWPs to measure serving cell 2, the UE 104 may not need to generate/transmit a NeedForGapinfo IE for band 2 or the UE 104 may generate/transmit a BWP-generic NeedForGapinfo IE with a "no gap" indication.

For the inter-frequency configurations, the UE 104 may be configured to measure band 1 and band 2. These bands to measure may have been indicated by the target band filter of the dynamic NeedForGap configuration such as that provided in UE configuration 304.

The UE 104 may determine that at least one measurement gap is needed for measuring band 1 and no gaps are needed for measuring band 2. Thus, the UE 104 may generate a NeedForGapinfo IE for band 1 that may be transmitted to the base station 108. The NeedForGapinfo IE may indicate whether a gap is needed for each BWP individually across the CCs. For example, with reference to the UE configuration 304, the UE 104 may indicate whether a gap is needed in each of the eight BWPs (four for the PCell and four for the SCell).

In addition to the indication of the need for a gap, the NeedForGapinfo IE may also indicate whether the needed gap is an NCSG, a legacy gap, or both; and may indicate a desired gap pattern.

As no gaps are needed for the BWPs to measure band 2, the UE 104 may not need to generate/transmit a NeedForGapinfo IE for band 2 or the UE 104 may generate/transmit a BWP-generic NeedForGapinfo IE with a "no gap" indication.

Figure 5:
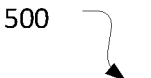
FIG. 5 illustrates a signaling procedure in accordance with some embodiments.

FIG. 5 illustrates a signaling procedure 500 in accordance with some embodiments.

The signaling procedure 500 may include, at 504, the base station 108 transmitting a UE capability enquiry to the UE 104. This enquiry may provide a set of radio access technologies for which UE capability information is requested. The set of radio access technologies may include NR, EUTRA-NR, and EUTRA. The EUTRA-NR technologies may related to non-standalone NR dual connectivity. The enquiry message may also specify operating bands of interest.

The signaling procedure 500 may further include, at 508, the UE 104 transmitting UE capability information to the base station 108. The UE capability information transmitted at 508 may be related to radio access technology capabilities and may be transmitted in one or more instances of a UE capability RAT containers.

The signaling procedure 500 may further include, at 512, the base station 108 sending an RRC reconfiguration message or an RRC resume message (RRC reconfig/resume). The RRC reconfig/resume message may include information to configure carrier aggregation and BWP based on, for example, the capabilities indicated at 508.

In some embodiments, the RRC reconfig/resume message may also include an indication of whether the UE 104 is to report BWP-specific NeedForGap information or BWP-generic NeedForGap information. The BWP-generic Need-ForGap information may be the legacy, Release 16 Need-ForGap request described above. The BWP-specific NeedForGap request may also be referred to as Rel 17

NeedForGap request as Release 17 will be the earliest 3GPP release in which it will be introduced.

In some embodiments, this indication of whether the UE 104 is to report BWP-specific NeedForGap information or BWP-generic NeedForGap information may be transmitted in the UE capability enquiry at 504.

The signaling procedure 500 may further include, at 516, the UE 104 transmitting an RRC reconfiguration complete message or RRC resume complete message (hereinafter "RRC reconfig/resume complete"). The RRC reconfig/resume complete message may include UE capability information regarding gaps for each BWP across serving CCs in order to measure target frequencies. The message may indicate whether a gap is needed for each BWP. In some embodiments, the message may also indicate whether a needed gap is an NCSG or a legacy gap. Further, some embodiments may include an indication of a gap pattern desired for a particular gap.

The signaling procedure 500 may further include, at 520, the base station 108 transmitting an RRC reconfiguration message to the UE 104. The RRC reconfiguration message may include gap configuration information that is based on the UE capability information transmitted at 516.

Figure 6:
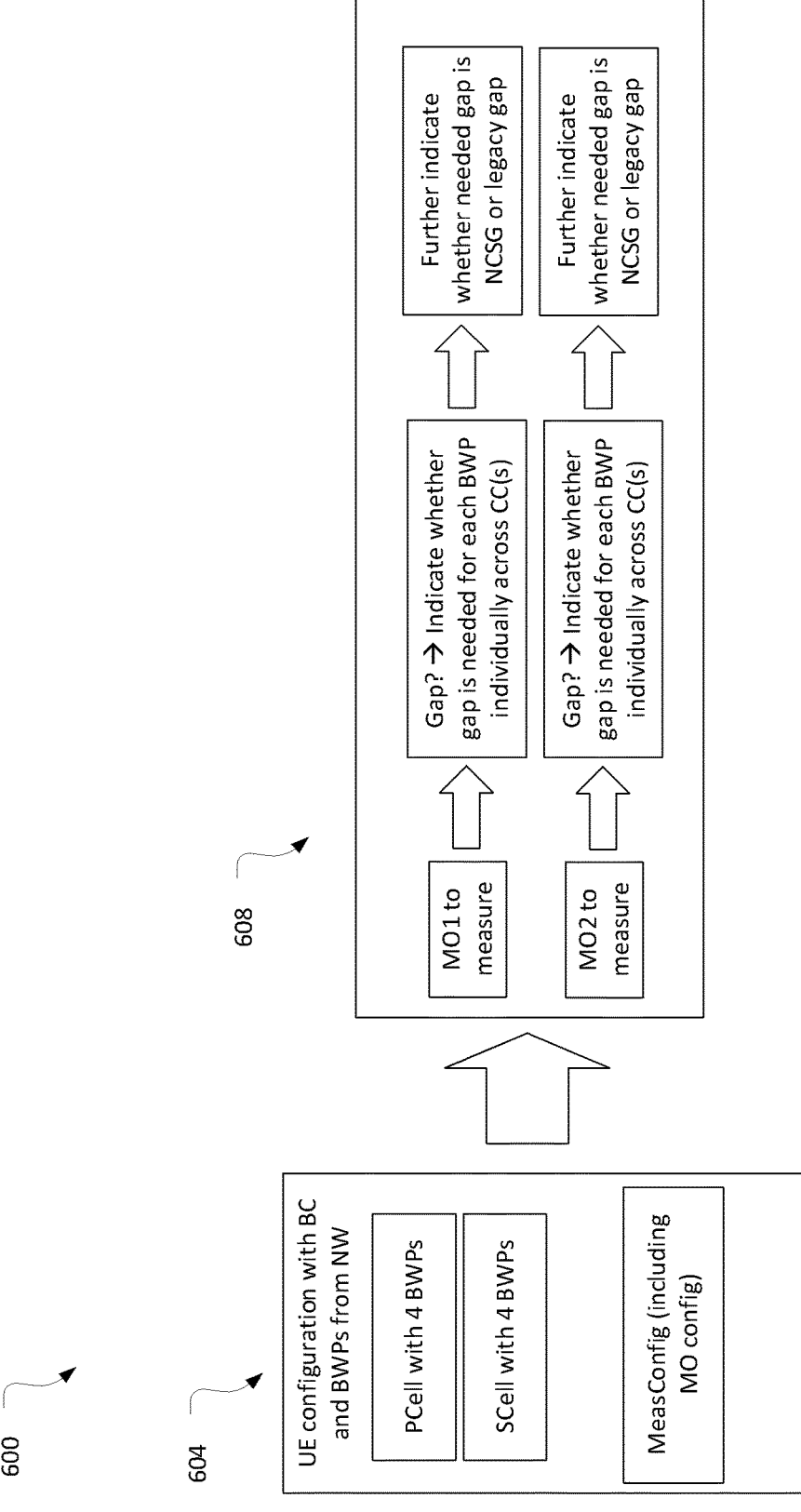
FIG. 6 illustrates configuration and UE capability information in accordance with some embodiments.

FIG. 6 illustrates configuration and UE capability information 600 in accordance with some embodiments.

The information 600 may include a UE configuration 604 provided by the network. The UE configuration 604 may provide the BC and BWPs on which the UE 104 is to operate, similar to that described above with respect to UE configuration 304.

The UE configuration 604 may also include a measurement configuration (MeasConfig) with MO configuration that configures the UE 104 with one or more measurement objects. The measurement objects may be inter-frequency, inter-frequency, or inter-RAT MOs. For purposes of the description herein, the MO configuration may configure a first measurement object (MO1) to measure and a second measurement object (MO2) to measure.

The information 600 may further include UE capability information 608. The UE capability information 608 may include information on the capability of the UE 104 for each measurement object configured by the MO configuration. For example, the UE capability information 608 may include gap information for MO1 to measure and MO2 to measure. For each of these MOs, the gap information may include a NeedForGapinfo IE that indicates whether a gap is needed for each BWP individually across the CCs. For example, with reference to the UE configuration 604, the UE 104 may indicate whether a gap is needed in each of the eight BWPs (four for the PCell and four for the SCell). If a gap is needed, the NeedForGapinfo IE may also indicate whether the needed gap is an NCSG, a legacy gap, or both.

Figure 7:
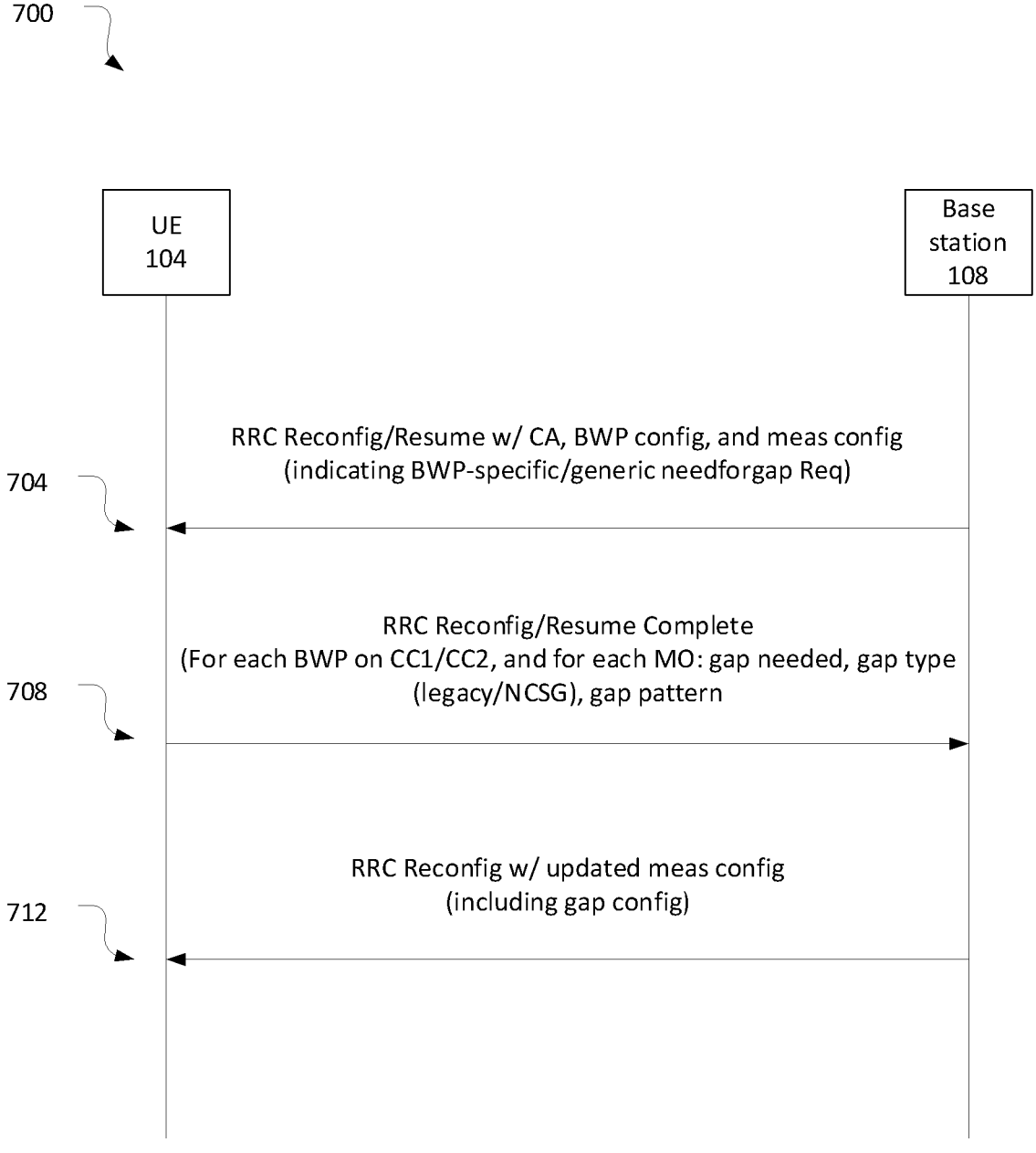
FIG. 7 illustrates another signaling procedure in accordance with some embodiments.

FIG. 7 illustrates a signaling procedure 700 in accordance with some embodiments.

The signaling procedure 700 may include, at 704, the base station 108 sending an RRC reconfig/resume message. The RRC reconfig/resume message may include CA/BWP configuration information. The RRC reconfig/resume message may further include measurement configuration information to configure one or more MOs to measure. In some embodiments, the RRC reconfig/resume message may further include an indication of whether BWP-specific or BWP-generic NeedForGap reporting is enabled.

The signaling procedure 700 may further include, at 708, the UE 104 transmitting an RRC reconfig/resume complete message. The RRC reconfig/resume complete message may include UE capability information regarding gaps for each BWP across serving CCs in order to perform the measurements configured by the MOs. The message may indicate whether a gap is needed for each BWP on CC1/CC2 for each MO. In some embodiments, the message may also indicate whether a needed gap is an NCSG or a legacy gap. Further, some embodiments may include an indication of a gap pattern desired for a particular gap.

The signaling procedure 700 may further include, at 712, the base station 108 transmitting an RRC reconfiguration message to the UE 104. The RRC reconfiguration message may include gap configuration information that is based on the UE capability information transmitted at 708.

While not shown, the signaling procedure 700 may also include a UE capability enquiry and UE capability information messages transmitted before the RRC reconfig/resume message similar to that described above with respect to FIG. 5.

The indication to enable BWP-specific/generic NeedForGap reporting, as described above with respect to FIG. 5 or FIG. 7, may be implemented by updating an RRC configuration message as follows:

```
RRCReconfiguration-v17xy-IEs ::=        SEQUENCE {
    needForGapsConfigNR-v17xy       SetupRelease {NeedForGapsConfigNR-v17xy}
      OPTIONAL,
    nonCriticalExtension            SEQUENCE { }        OPTIONAL
}.
```

The NeedForGapsConfigNR-v17xy value may indicate that the Rel17/BWP-specific NeedForGap request is enabled.

The NeedForGapsInfoNR IE, which may be included in the RRC reconfig/resume complete message may be defined for Rel 17 (or later releases by appropriately updating the R17 suffixes) as follows.

```
NeedForGapsInfoNR-r17 ::=        SEQUENCE {
    intraFreq-needForGap-r17        NeedForGapsIntraFreqlist-r17,
    interFreq-needForGap-r17        NeedForGapsBandListNR-r17
}
NeedForGapsIntraFreqList-r17 ::=    SEQUENCE (SIZE (1..maxNrofServingCells)) OF
NeedForGapsIntraFreq-r17
NeedForGapsBandListNR-r17 ::=        SEQUENCE (SIZE (1..maxBands)) OF
NeedForGapsNR-r17
NeedForGapsIntraFreq-r17 ::=        SEQUENCE {
    servCellId-r16                  ServCellIndex,
    gapIndicationIntraList-r17          SEQUENCE (SIZE (1..maxBWP)) OF
GapIndication-r17
}
NeedForGapsNR-r17               SEQUENCE {
    bandNR-r16                  FreqBandIndicatorNR,
    gapIndicationList-r17           SEQUENCE (SIZE (1..maxBWP)) OF GapIndication-r17
}
GapIndication-r17 ::=                SEQUENCE {
    gapIndication-r17               ENUMERATED {gap, NCSG, no-gap, spare} OPTIONAL,
    gapPattern-r17              BIT STRING (SIZE (10))            OPTIONAL
}.
```

With the exception of gapIndicationIntraList-r17, gapIndicationList-r17, and gapindication-r17, the fields of the NeedsForGapInfoNR IE may be similar to like-named fields described in section 6.3.2 of TS 38.331.

The gapIndicationIntraList-r17 field may indicate whether measurement gap is required for each BWP individually across CCs for the UE to perform intra-frequency SSB based measurements on the concerned serving cell. A sequence of Gapindication-r17 may be provided with one sequence corresponding to each BWP. Each sequence may indicate whether legacy gap is needed, whether an NCSG is needed, or whether no-gap is needed for the corresponding BWP.

The gapindicationList-r17 field may indicate measurement gap is required for each BWP individually across CCs for the UE to perform SSB based measurements on the concerned NR target band while NR-DC or NE-DC is not configured. A sequence of Gapindication-r17 may be provided with one sequence corresponding to each BWP. Each sequence may indicate whether legacy gap is needed, whether an NCSG is needed, or whether no-gap is needed for the corresponding BWP.

In embodiments in which the gaps are defined for MOs, the NeedForGapsInfoNR IE may be defined for Rel 17 (or later releases by appropriately updating the R17 suffixes) as follows.

```
NeedForGapInfoNR-r17 ::=    SEQUENCE {
    needForGap-r17          NeedForGapsNR-r17
}
NeedForGapsNR-r17 ::=       SEQUENCE {
    measObjectId                MeasObjectId                        OPTIONAL,
    gapIndicationList-r17          SEQUENCE (SIZE (1..maxBWP)) OF GapIndication-r17
}
GapIndication-r17 ::=       SEQUENCE {
gapIndication-r17              ENUMERATED {gap, NCSG, no-gap}
OPTIONAL,
gapPattern-r17             BIT STRING (SIZE (10))
OPTIONAL
}.
```

This NeedsForGapInfoNR IE may include a measObjectID to identify a measurement object, which was configured in the MO configuration information, for which the needed gaps are reported. The gapindicationList-r17 field may indicate measurement gap is required for each BWP individually across CCs for the UE to perform measurements as configured by the corresponding MO. A sequence of Gapindication-r17 may be provided with one sequence corresponding to each BWP. Each sequence may indicate whether legacy gap is needed, whether an NCSG is needed, or whether no-gap is needed for the corresponding BWP.

Figure 8:
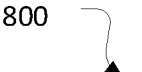
FIG. 8 illustrates an operational flow/algorithmic structure in accordance with some embodiments.
Figure 8:
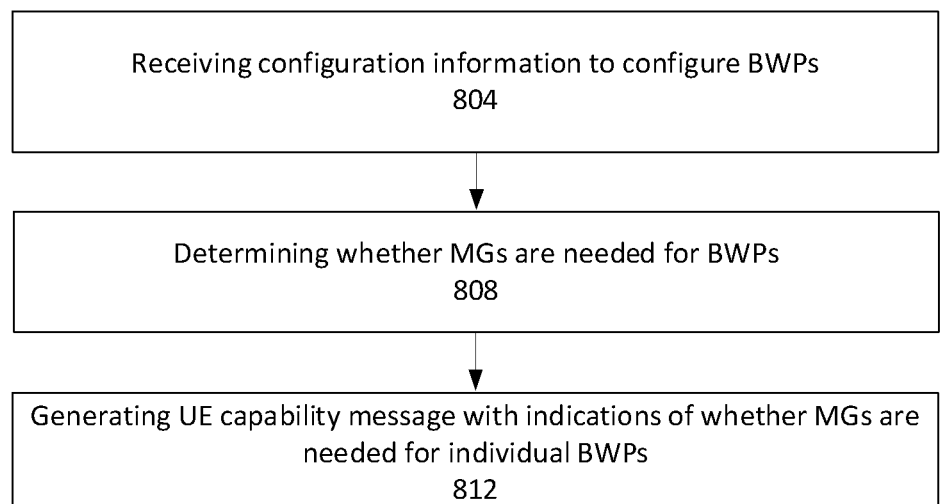

FIG. 8 illustrates an operation flow/algorithmic structure 800 in accordance with some embodiments. The operation flow/algorithmic structure 800 may be performed or implemented by a user equipment such as, for example, UE 104 or 1100; or components thereof, for example, baseband processor 1104A.

The operation flow/algorithmic structure 800 may include, at 804, receiving configuration information to configure BWPs. The base station may use dedicated signaling to configure up to four downlink BWPs per serving cell. The serving cells may be configured as CA serving cells or DC serving cells.

In some embodiments, the configuration information received from the base station may additionally/alternatively include an indication of whether the UE is to report BWP-specific or BWP-generic need-for-gap information.

The configuration information may be received in one or more configuration messages from the base station.

The operation flow/algorithmic structure 800 may further include, at 808, determining whether measurement gaps are needed for individual BWPs of the configured BWPs to measure target frequencies. The individual BWPs may be distributed across one or more component carriers based on the CA/DC configuration.

The target frequencies may be intra-frequency serving cells or inter-frequency NR bands. In some embodiments, the UE may determine the target frequencies that are to be measured based on a target band filter received from the base station in a NeedForGap request. In other embodiments, the UE may determine the target frequencies that are to be measured based on configured measurement objects.

In some embodiments, the UE may also determine desired gap patterns for the needed gaps and whether the needed gaps are NCSGs or legacy gaps.

The operation flow/algorithmic structure 800 may further include, at 812, generating a UE capability message with indications of whether the measurement gaps are needed for the individual BWPs. In some embodiments, the UE capability message may further include indications of desired gap patterns and whether the needed gaps are NCSGs or legacy gaps.

Figure 9:
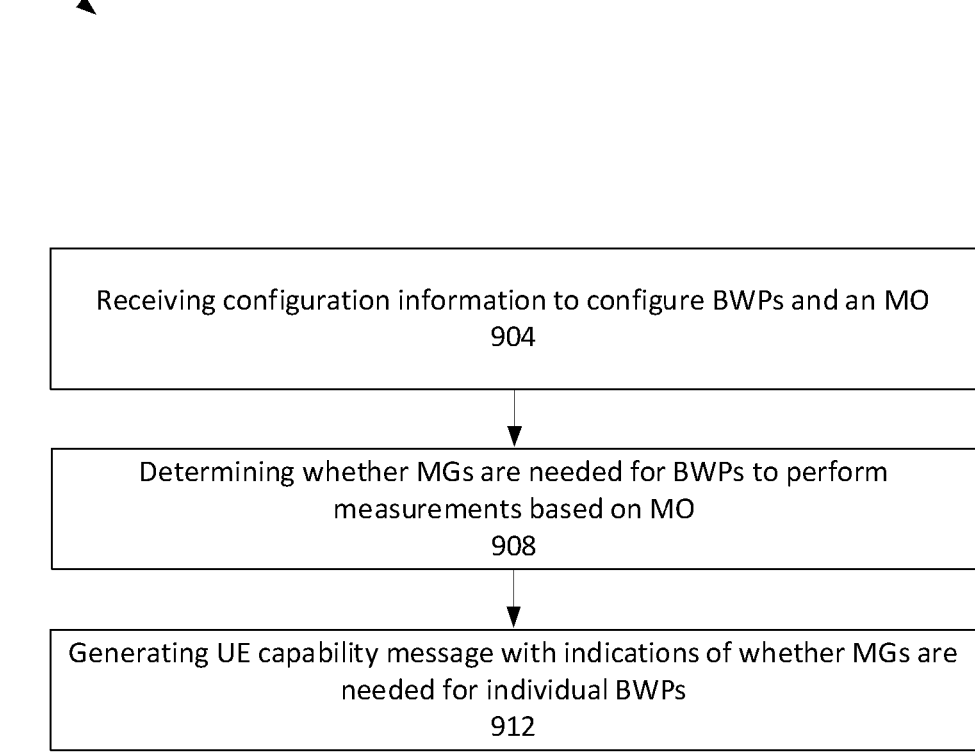
FIG. 9 illustrates another operational flow/algorithmic structure in accordance with some embodiments.

FIG. 9 illustrates an operation flow/algorithmic structure 900 in accordance with some embodiments. The operation flow/algorithmic structure 900 may be performed or implemented by a user equipment such as, for example, UE 104 or 1100; or components thereof, for example, baseband processor 1104A.

The operation flow/algorithmic structure 900 may include, at 904, receiving configuration information to configure BWPs and a measurement object. The configuration of the BWPs may be similar to that described above with respect to FIG. 8.

The configuration information to configure the measurement object may be a measurement configuration IE that is transmitted separately from the configuration information that configures the BWPs. The measurement configuration IE may configure one or more MOs, which may be inter-frequency MOs, intra-frequency, or inter-RAT MOs. The MOs may configure measurements on specific frequency and reference signal targets.

The configuration information received from the base station may additionally/alternatively include an indication of whether the UE is to report BWP-specific or BWP-generic need-for-gap information.

The operation flow/algorithmic structure 900 may further include, at 908, determining whether measurement gaps are needed for individual BWPs of the configured BWPs to perform the measurements as provided by the configured MOs.

By providing the NeedForGap information at the MO-level, the gap information of the UE capability information may be may be more specifically tailored to specifically configured measurements. For example, the UE may be capable of determining whether a measurement gap is needed not only for a specific target frequency, but also for a specific reference signal. For example, a first MO may indicate a measurement is to be performed on a first frequency on a first reference signal (for example, a first one of SSB or CSI-RS), while a second MO may indicate a measurement is to be performed on the first frequency on a second reference signal (for example, a second one of SSB or CSI-RS). In some instances, the UE may need a measurement gap for one or more BWPS for one of these MOs, but not the other, and may inform the network of the same by the disclosed reporting procedures.

In some embodiments, the UE may also determine desired gap patterns for the needed gaps and whether the needed gaps are NCSG or legacy gaps similar to that described elsewhere herein.

The operation flow/algorithmic structure 900 may further include, at 912, generating a UE capability message with indications of whether the measurement gaps are needed for the individual BWPs for performing the measurements of the MOs. In some embodiments, the UE capability message may further include indications of desired gap patterns and whether the needed gaps are NCSG or legacy gaps.

Figure 10:
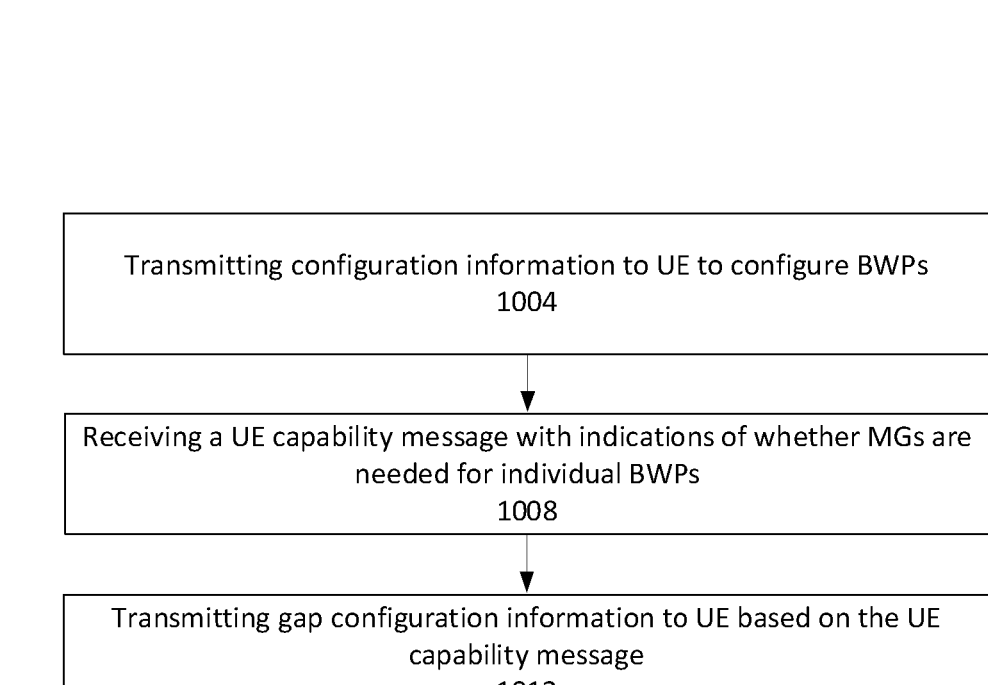
FIG. 10 illustrates another operational flow/algorithmic structure in accordance with some embodiments.

FIG. 10 illustrates an operation flow/algorithmic structure 1000 in accordance with some embodiments. The operation flow/algorithmic structure 1000 may be performed or implemented by a base station such as, for example, base station 108 or 1200; or components thereof, for example, baseband processor 1204A.

The operation flow/algorithmic structure 1000 may include, at 1004, transmitting configuration information to a UE to configure a plurality of BWPs. The BWPs may be configured as described elsewhere herein.

The operation flow/algorithmic structure 1000 may include, at 1008, receiving a UE capability message with indications of whether MGs are needed for individual BWPs. The indications may be BWP-specific indications that indicate whether individual BWPs need measurement gaps to perform measurements on target frequencies. The indications may be a bit string in a NeedForGapinfo IE. The indications in the UE capability message may also include whether the needed gaps are legacy gaps or NCSGs, and a desired gap pattern.

The operation flow/algorithmic structure 1000 may include, at 1012, transmitting gap configuration information to the UE based on the UE capability message. The gap configuration may schedule needed gaps in the BWPs as indicated by the NeedForGapinfo report.

Figure 11:
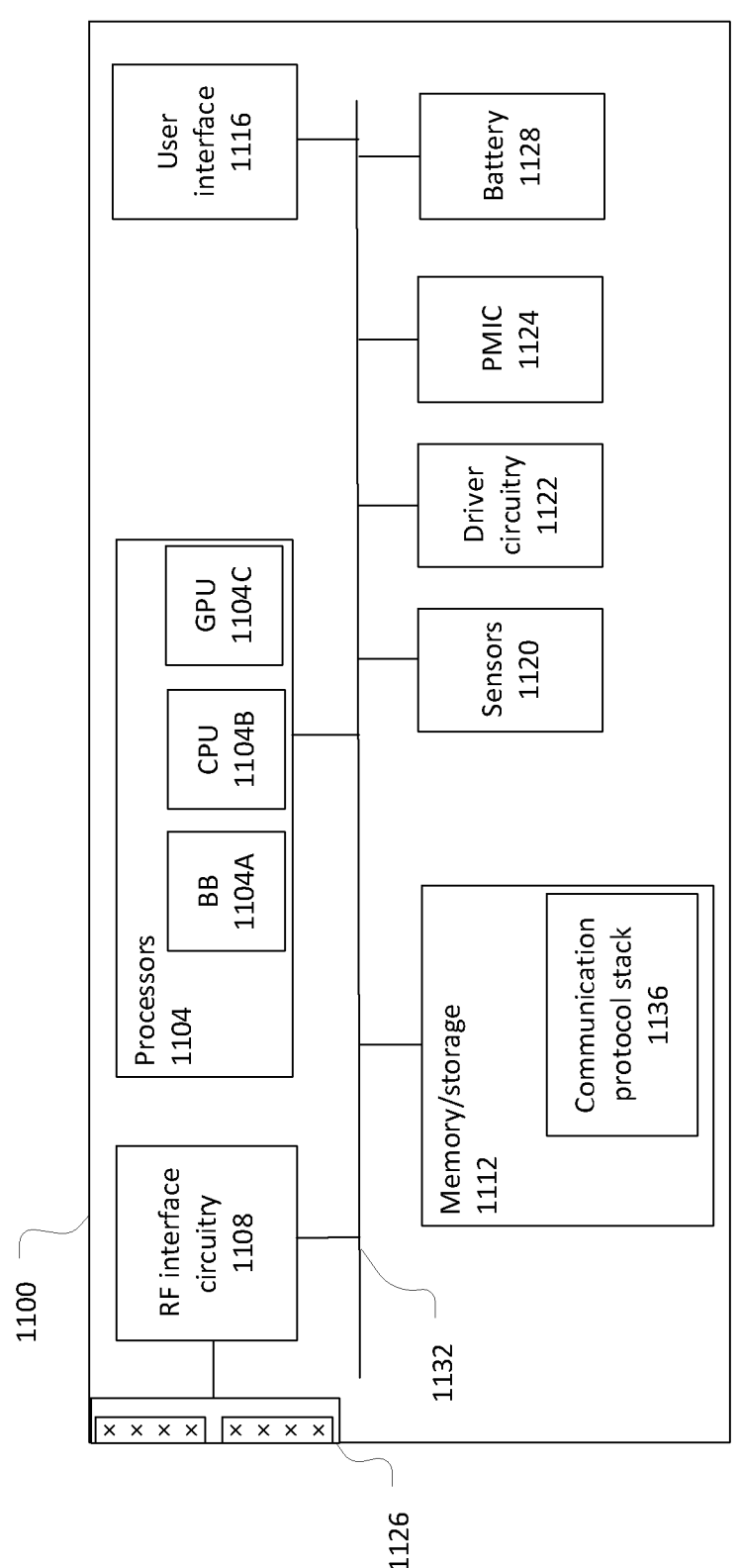
FIG. 11 illustrates a user equipment in accordance with some embodiments.

FIG. 11 illustrates a UE 1100 in accordance with some embodiments. The UE 1100 may be similar to and substantially interchangeable with UE 114 of FIG. 1.

The UE 1100 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, or actuators), video surveillance/monitoring devices (for example, cameras or video cameras), wearable devices (for example, a smart watch), or Internet-of-things devices.

The UE 1100 may include processors 1104, RF interface circuitry 1108, memory/storage 1112, user interface 1116, sensors 1120, driver circuitry 1122, power management integrated circuit (PMIC) 1124, antenna structure 1126, and battery 1128. The components of the UE 1100 may be implemented as integrated circuits (ICs), portions thereof, discrete electronic devices, or other modules, logic, hardware, software, firmware, or a combination thereof. The block diagram of FIG. 11 is intended to show a high-level view of some of the components of the UE 1100. However, some of the components shown may be omitted, additional components may be present, and different arrangement of the components shown may occur in other implementations.

The components of the UE 1100 may be coupled with various other components over one or more interconnects 1132, which may represent any type of interface, input/output, bus (local, system, or expansion), transmission line, trace, or optical connection that allows various circuit components (on common or different chips or chipsets) to interact with one another.

The processors 1104 may include processor circuitry such as, for example, baseband processor circuitry (BB) 1104A, central processor unit circuitry (CPU) 1104B, and graphics processor unit circuitry (GPU) 1104C. The processors 1104 may include any type of circuitry or processor circuitry that executes or otherwise operates computer-executable instructions, such as program code, software modules, or functional processes from memory/storage 1112 to cause the UE 1100 to perform operations as described herein.

In some embodiments, the baseband processor circuitry 1104A may access a communication protocol stack 1136 in the memory/storage 1112 to communicate over a 3GPP compatible network. In general, the baseband processor circuitry 1104A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 1108.

The baseband processor circuitry 1104A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The memory/storage 1112 may include one or more non-transitory, computer-readable media that includes instructions (for example, communication protocol stack 1136) that may be executed by one or more of the processors 1104 to cause the UE 1100 to perform various operations described herein. The memory/storage 1112 include any type of volatile or non-volatile memory that may be distributed throughout the UE 1100. In some embodiments, some of the memory/storage 1112 may be located on the processors 1104 themselves (for example, L1 and L2 cache), while other memory/storage 1112 is external to the processors 1104 but accessible thereto via a memory interface. The memory/storage 1112 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 1108 may include transceiver circuitry and radio frequency front module (RFEM) that allows the UE 1100 to communicate with other devices over a radio access network. The RF interface circuitry 1108 may include various elements arranged in transmit or receive paths. These elements may include, for example, switches, mixers, amplifiers, filters, synthesizer circuitry, and control circuitry.

In the receive path, the RFEM may receive a radiated signal from an air interface via antenna structure 1126 and proceed to filter and amplify (with a low-noise amplifier) the signal. The signal may be provided to a receiver of the transceiver that down-converts the RF signal into a baseband signal that is provided to the baseband processor of the processors 1104.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1126.

In various embodiments, the RF interface circuitry 1108 may be configured to transmit/receive signals in a manner compatible with NR access technologies.

The antenna 1126 may include antenna elements to convert electrical signals into radio waves to travel through the air and to convert received radio waves into electrical signals. The antenna elements may be arranged into one or more antenna panels. The antenna 1126 may have antenna panels that are omnidirectional, directional, or a combination thereof to enable beamforming and multiple input, multiple output communications. The antenna 1126 may include microstrip antennas, printed antennas fabricated on the surface of one or more printed circuit boards, patch antennas, or phased array antennas. The antenna 1126 may have one or more panels designed for specific frequency bands including bands in FR1 or FR2.

The user interface circuitry 1116 includes various input/output (I/O) devices designed to enable user interaction with the UE 1100. The user interface 1116 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes (LEDs) and multi-character visual outputs, or more complex outputs such as display devices or touchscreens (for example, liquid crystal displays (LCDs), LED displays, quantum dot displays, and projectors), with the output of characters, graphics, multimedia objects, and the like being generated or produced from the operation of the UE 1100.

The sensors 1120 may include devices, modules, or subsystems whose purpose is to detect events or changes in its environment and send the information (sensor data) about the detected events to some other device, module, or subsystem. Examples of such sensors include inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; and microphones or other like audio capture devices.

The driver circuitry 1122 may include software and hardware elements that operate to control particular devices that are embedded in the UE 1100, attached to the UE 1100, or otherwise communicatively coupled with the UE 1100. The driver circuitry 1122 may include individual drivers allowing other components to interact with or control various input/output (I/O) devices that may be present within, or connected to, the UE 1100. For example, driver circuitry 1122 may include a display driver to control and allow access to a display device, a touchscreen driver to control and allow access to a touchscreen interface, sensor drivers to obtain sensor readings of sensor circuitry 1120 and control and allow access to sensor circuitry 1120, drivers to obtain actuator positions of electro-mechanic components or control and allow access to the electro-mechanic components, a camera driver to control and allow access to an embedded image capture device, audio drivers to control and allow access to one or more audio devices.

The PMIC 1124 may manage power provided to various components of the UE 1100. In particular, with respect to the processors 1104, the PMIC 1124 may control power-source selection, voltage scaling, battery charging, or DC-to-DC conversion.

In some embodiments, the PMIC 1124 may control, or otherwise be part of, various power saving mechanisms of the UE 1100 including DRX as discussed herein.

A battery 1128 may power the UE 1100, although in some examples the UE 1100 may be mounted deployed in a fixed location, and may have a power supply coupled to an electrical grid. The battery 1128 may be a lithium ion battery, a metal-air battery, such as a zinc-air battery, an aluminum-air battery, a lithium-air battery, and the like. In some implementations, such as in vehicle-based applications, the battery 1128 may be a typical lead-acid automotive battery.

Figure 12:
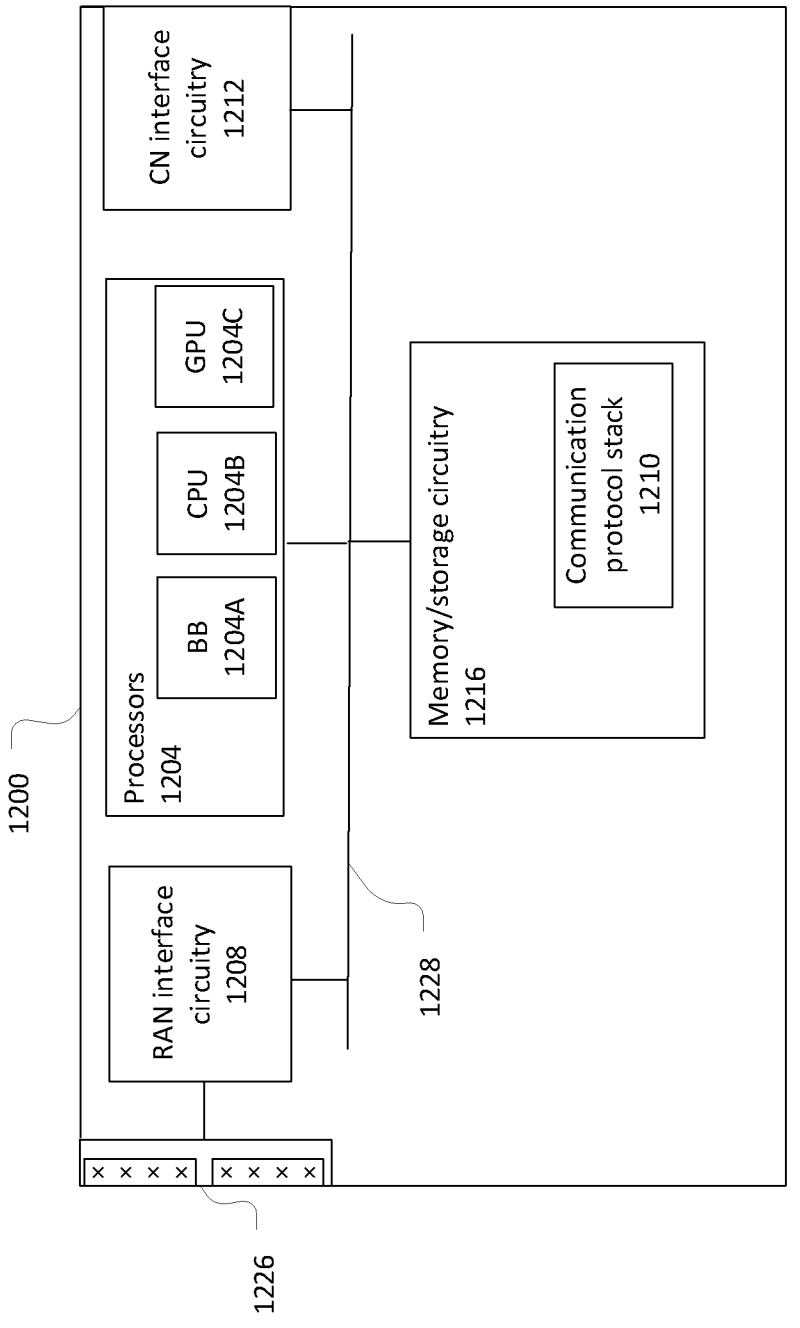
FIG. 12 illustrates a base station in accordance with some embodiments.

FIG. 12 illustrates a base station 1200 in accordance with some embodiments. The base station 1200 may be similar to and substantially interchangeable with base station 108 of FIG. 1.

The base station 1200 may include processors 1204, RF interface circuitry 1208, core network (CN) interface circuitry 1212, memory/storage circuitry 1216, and antenna structure 1226.

The components of the base station 1200 may be coupled with various other components over one or more interconnects 1228.

The processors 1204, RF interface circuitry 1208, memory/storage circuitry 1216 (including communication protocol stack 1210), antenna structure 1226, and interconnects 1228 may be similar to like-named elements shown and described with respect to FIG. 11.

The CN interface circuitry 1212 may provide connectivity to a core network, for example, a $5^{th}$ Generation Core network (5GC) using a 5GC-compatible network interface protocol such as carrier Ethernet protocols, or some other suitable protocol. Network connectivity may be provided to/from the base station 1200 via a fiber optic or wireless backhaul. The CN interface circuitry 1212 may include one or more dedicated processors or FPGAs to communicate using one or more of the aforementioned protocols. In some implementations, the CN interface circuitry 1212 may include multiple controllers to provide connectivity to other networks using the same or different protocols.

In some embodiments, the base station 1200 may be coupled with transmit receive points (TRPs) using the antenna structure 1226, CN interface circuitry, or other interface circuitry.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, or network element as described above in connection with one or more of the preceding figures may be configured to operate in accordance with one or more of the examples set forth below in the example section.

EXAMPLES

In the following sections, further exemplary embodiments are provided.

Example 1 includes a method of operating a user equipment (UE), the method comprising: receiving configuration information to configure a plurality of bandwidth parts (BWPs); determining whether measurement gaps are needed for individual BWPs of the plurality of BWPs to measure target frequencies; and generating a UE capability message with indications of whether the measurement gaps are needed for the individual BWPs of the plurality of BWPs.

Example 2 includes the method of example 1, further comprising: receiving a target band filter to indicate the target frequencies for which the UE is requested to report gap requirement information; and determining whether measurement gaps are needed for the plurality of BWPs based on the target band filter.

Example 3 includes the method of example 2, wherein the target frequencies comprise one or more target new radio (NR) bands.

Example 4 includes the method of example 2, wherein receiving the target band filter comprises: processing a need-for-gap request received from a base station to obtain the target band filter.

Example 5 includes the method of example 1, wherein the configuration information is to configure a component carrier with the plurality of BWPs and the method further comprises: generating the UE capability message with a first indication that a first BWP of the plurality of BWPs needs a measurement gap and a second indication that a second BWP of the plurality of BWPs does not need a measurement gap.

Example 6 includes the method of example 1, further comprising: determining whether a measurement gap is needed for a first BWP of the plurality of BWPs to perform an intra-frequency measurement on a first serving cell; and generating the UE capability message to include a first indication of whether the measurement gap is needed for the first BWP.

Example 7 includes the method of example 1, further comprising: determining whether a measurement gap is needed for a first BWP of the plurality of BWPs to perform an inter-frequency measurement on a first band; and generating the UE capability message to include a first indication of whether the measurement gap is needed for the first BWP.

Example 8 includes the method of example 1, wherein the configuration information is to configure a first component carrier having a first set of BWPs of the plurality of BWPs and to configure a second component carrier having a second set of BWPs of the plurality of BWPs, wherein the first and second component carriers are configured for carrier aggregation or dual connectivity.

Example 9 includes the method of example 1, further comprising: determining a first measurement gap is needed for a first BWP of the plurality of BWPs to perform a measurement; and generating the UE capability message to include a first indication that the measurement gap is needed for the first BWP to perform the measurement and a second indication that the first measurement gap is a network-controlled small gap (NCSG) or a legacy gap.

Example 10 includes the method of example 1, further comprising: receiving, from a base station, information to configure the UE to report BWP-specific need-for-gap information; and generating the UE capability message based on the information to configure the UE to report BWP-specific need-for-gap information.

Example 11 includes the method of example 1, further comprising: determining a first measurement gap is needed for a first BWP of the plurality of BWPs to perform a measurement; and generating the UE capability message to include a first indication that the first measurement gap is needed for the first BWP to perform the measurement and a second indication of a gap pattern for the first measurement gap.

Example 12 includes a method of operating a user equipment (UE), the method comprising: receiving configuration information to configure a plurality of bandwidth parts (BWPs) and a measurement object; determining whether measurement gaps are needed for individual BWPs of the plurality of BWPs to perform measurements based on the measurement object; and generating a UE capability message with indications of whether the measurement gaps are needed for the individual BWPs of the plurality of BWPs.

Example 13 includes the method of example 12, wherein the measurement object is a first measurement object, the configuration information is to further configure a second measurement object, and the method comprises: determining whether measurement gaps are needed for individual BWPs of the plurality of BWPs to perform measurements based on the second measurement object; and generating the UE capability message with first indications of whether the measurement gaps are needed for the individual BWPs of the plurality of BWPs to perform measurements based on the first measurement object and second indications of whether the measurement gaps are needed for the individual BWPs of the plurality of BWPs to perform measurements based on the second measurement object.

Example 14 includes the method of example 12, wherein the configuration information is to configure a component carrier with the plurality of BWPs and the method further comprises: generating the UE capability message with a first indication that a first BWP of the plurality of BWPs needs a measurement gap and a second indication that a second BWP of the plurality of BWPs does not need a measurement gap.

Example 15 includes the method of example 12, wherein the measurement object is to configure an intra-frequency measurement on a first serving cell or an inter-frequency measurement on a first band.

Example 16 includes the method of example 12, further comprising: determining a first measurement gap is needed for a first BWP of the plurality of BWPs to perform a measurement; and generating the UE capability message to include a first indication that the measurement gap is needed for the first BWP to perform the measurement and a second indication that the first measurement gap is a network-controlled small gap (NCSG) or a legacy gap.

Example 17 includes the method of example 12, further comprising: determining a first measurement gap is needed for a first BWP of the plurality of BWPs to perform a measurement; and generating the UE capability message to include a first indication that the first measurement gap is needed for the first BWP to perform the measurement and a second indication of a gap pattern for the first measurement gap.

Example 18 includes a method of operating a base station, the method comprising: transmitting configuration information to a user equipment (UE) to configure a plurality of bandwidth parts (BWPs); receiving, from the UE, a UE capability message with indications of whether measurement gaps are needed for individual BWPs of the plurality of BWPs; and transmitting gap configuration information to the UE based on the UE capability message.

Example 19 includes the method of example 18, further comprising: transmitting information to configure the UE to report BWP-specific need-for-gap information.

Example 20 includes the method of example 18, further comprising: transmitting, to the UE, an indication that the UE is to report BWP-specific need-for-gap information.

Example 21 may include an apparatus comprising means to perform one or more elements of a method described in or related to any of examples 1-20, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 23 may include an apparatus comprising logic, modules, or circuitry to perform one or more elements of a method described in or related to any of examples 1-20, or any other method or process described herein.

Example 24 may include a method, technique, or process as described in or related to any of examples 1-20, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of examples 1-20, or portions thereof.

Example 26 may include a signal as described in or related to any of examples 1-20, or portions or parts thereof.

Example 27 may include a datagram, information element, packet, frame, segment, PDU, or message as described in or related to any of examples 1-20, or portions or parts thereof, or otherwise described in the present disclosure.

Example 28 may include a signal encoded with data as described in or related to any of examples 1-20, or portions or parts thereof, or otherwise described in the present disclosure.

Example 29 may include a signal encoded with a datagram, IE, packet, frame, segment, PDU, or message as described in or related to any of examples 1-20, or portions or parts thereof, or otherwise described in the present disclosure.

Example 30 may include an electromagnetic signal carrying computer-readable instructions, wherein execution of the computer-readable instructions by one or more processors is to cause the one or more processors to perform the method, techniques, or process as described in or related to any of examples 1-20, or portions thereof.

Example 31 may include a computer program comprising instructions, wherein execution of the program by a processing element is to cause the processing element to carry out the method, techniques, or process as described in or related to any of examples 1-20, or portions thereof.

Example 32 may include a signal in a wireless network as shown and described herein.

Example 33 may include a method of communicating in a wireless network as shown and described herein.

Example 34 may include a system for providing wireless communication as shown and described herein.

Example 35 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
receiving configuration information to configure a plurality of bandwidth parts (BWPs);
determining a measurement gap is needed for a BWP of the plurality of BWPs to measure a target frequency; and
generating a user equipment (UE) capability message to include a first indication and a second indication, wherein the first indication is to indicate that the measurement gap is needed for the BWP and the second indication is to indicate whether the measurement gap should be a network-controlled small gap (NCSG) or a legacy gap.

2. The method of claim 1, further comprising:
receiving a target band filter to indicate the target frequencies for which the UE is requested to report gap requirement information; and
determining measurement gaps are needed for the plurality of BWPs based on the target band filter.

3. The method of claim 2, wherein the target frequencies comprise one or more target new radio (NR) bands.

4. The method of claim 2, wherein receiving the target band filter comprises:
processing a need-for-gap request received from a base station to obtain the target band filter.

5. The method of claim 1, wherein the configuration information is to configure a component carrier with the plurality of BWPs and the method further comprises:
generating the UE capability message to further include another indication that another BWP of the plurality of BWPs does not need a measurement gap.

6. The method of claim 1, further comprising:
determining the measurement gap is needed for the BWP to perform an intra-frequency measurement on a first serving cell; and
generating the UE capability message to include another indication to indicate that the measurement gap is needed for the BWP to perform an intra-frequency measurement.

7. The method of claim 1, further comprising:
determining the measurement gap is needed for the BWP to perform an inter-frequency measurement on a first band; and
generating the UE capability message to include another indication to indicate that the measurement gap is needed for the BWP to perform an inter-frequency measurement.

8. The method of claim 1, wherein the configuration information is to configure a first component carrier having a first set of BWPs of the plurality of BWPs and to configure a second component carrier having a second set of BWPs of the plurality of BWPs, wherein the first and second component carriers are configured for carrier aggregation or dual connectivity.

9. The method of claim 1, wherein the first indication and the second indication are included in a NeedForGapsInfoNR information element.

10. The method of claim 1, further comprising:
receiving, from a base station, information to configure the UE to report BWP-specific need-for-gap information; and generating the UE capability message based on the information to configure the UE to report BWP-specific need-for-gap information.

11. The method of claim 1, further comprising:
generating the UE capability message to further include another indication of a gap pattern for the measurement gap.

12. An apparatus, comprising:
processing circuitry to:
receiving configuration information to configure a plurality of bandwidth parts (BWPs) and a measurement object;
determine a measurement gap is needed for a BWP of the plurality of BWPs to perform measurements based on the measurement object; and
generate a user equipment (UE) capability message with a first indication and a second indication, wherein the first indication is to indicate that the measurement gap is needed for the BWP and the second indication is to indicate whether the measurement gap should be a network-controlled small gap (NCSG) or a legacy gap; and
interface circuitry, coupled with the processing circuitry, to transmit the UE capability message.

13. The apparatus of claim 12, wherein the measurement object is a first measurement object, the configuration information is to further configure a second measurement object, and the processing circuitry is further to:
determine the measurement gap is needed for another BWP of the plurality of BWPs to perform measurements based on the second measurement object; and
generate the UE capability message to further include another indication that the measurement gap is needed for the other BWP of the plurality of BWPs to perform measurements based on the second measurement object.

14. The apparatus of claim 12, wherein the configuration information is to configure a component carrier with the plurality of BWPs and the processing circuitry is further to:
generate the UE capability message to further include another indication that another BWP of the plurality of BWPs does not need a measurement gap.

15. The apparatus of claim 12, wherein the measurement object is to configure an intra-frequency measurement on a first serving cell or an inter-frequency measurement on a first band.

16. The apparatus of claim 12, wherein the first indication and the second indication are included in a NeedForGapsInfoNR information element.

17. The apparatus of claim 12, wherein the processing circuitry is further to:
generate the UE capability message to further include another indication of to indicate a gap pattern for the measurement gap.

18. A method comprising:
outputting, for transmission, configuration information to a user equipment (UE) to configure a plurality of bandwidth parts (BWPs);
receiving, from the UE, a UE capability message including a first indication and a second indication, wherein the first indication is to indicate a measurement gap is needed for a BWP of the plurality of BWPs and the second indication is to indicate whether the measurement gap should be a network-controlled small gap (NCSG) or a legacy gap; and
outputting, for transmission, gap configuration information to the UE based on the UE capability message.

19. The method of claim 18, further comprising:

outputting, for transmission, information to configure the UE to report BWP-specific need-for-gap information.

20. The method of claim 18, further comprising:

outputting, for transmission, to the UE, an indication that the UE is to report BWP-specific need-for-gap information.

\* \* \* \* \*